(12) United States Patent
Matsuura et al.

(10) Patent No.: US 10,666,885 B2
(45) Date of Patent: May 26, 2020

(54) SOLID-STATE IMAGING DEVICE COMPRISING A PLURALITY OF PIXELS WITH PLURALITY OF CHARGE DETECTION PARTS AND INDIVIDUAL CURRENT SOURCES

(71) Applicants: Kabushiki Kaisha Toshiba, Minato-ku, Tokyo (JP); Toshiba Electronic Devices & Storage Corporation, Minato-ku, Tokyo (JP)

(72) Inventors: Masakazu Matsuura, Yokohama Kanagawa (JP); Ryuuta Inobe, Fujisawa Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 72 days.

(21) Appl. No.: 16/128,765

(22) Filed: Sep. 12, 2018

(65) Prior Publication Data
US 2019/0297290 A1 Sep. 26, 2019

(30) Foreign Application Priority Data
Mar. 23, 2018 (JP) ................................ 2018-056080

(51) Int. Cl.
*H04N 5/369* (2011.01)

(52) U.S. Cl.
CPC ................................ *H04N 5/3698* (2013.01)

(58) Field of Classification Search
CPC .... H04N 5/3658; H04N 5/3745; H04N 5/378; H04N 5/2173; H04N 5/3698; H04N 5/374; H04N 5/365; H01L 27/14609; H01L 27/14643
USPC .......................................... 250/208.1, 214 R
See application file for complete search history.

(56) References Cited

U.S. PATENT DOCUMENTS

| | | | |
|---|---|---|---|
| 7,408,167 B2 * | 8/2008 | Kameshima | H01L 27/14663 250/370.09 |
| 8,953,074 B2 | 2/2015 | Nomura et al. | |
| 9,210,349 B2 | 12/2015 | Yamazaki | |

FOREIGN PATENT DOCUMENTS

| | | |
|---|---|---|
| JP | 2009-213012 A | 9/2009 |
| JP | 2012-165168 A | 8/2012 |
| JP | 2014-127927 A | 7/2014 |

* cited by examiner

*Primary Examiner* — Que Tan Le
(74) *Attorney, Agent, or Firm* — White & Case LLP

(57) ABSTRACT

According to one embodiment, a solid-state imaging device includes a plurality of pixels, a plurality of charge detection parts, a signal line, an output circuit, and a plurality of individual current sources. The pixels are arranged in a first direction. Each of the pixels includes a photoelectric conversion part. The charge detection parts convert signal charges of photoelectric conversion parts of the pixels to voltages. The signal line is commonly connected to the charge detection parts. The output circuit amplifies a signal output of the signal line. The individual current sources are provided for each of the pixels, and are connected to the signal line.

10 Claims, 2 Drawing Sheets

SOLID-STATE IMAGING DEVICE COMPRISING A PLURALITY OF PIXELS WITH PLURALITY OF CHARGE DETECTION PARTS AND INDIVIDUAL CURRENT SOURCES

CROSS-REFERENCE TO RELATED APPLICATIONS

This application is based upon and claims the benefit of priority from Japanese Patent Application No. 2018-056080, filed on Mar. 23, 2018; the entire contents of which are incorporated herein by reference.

FIELD

Embodiments described herein relate generally to a solid-state imaging device.

BACKGROUND

For example, in a linear sensor, the configuration has been known, where one common current source is provided in one signal output line commonly connected to multiple pixels arranged in one direction.

DETAILED DESCRIPTION

Figure 1A:
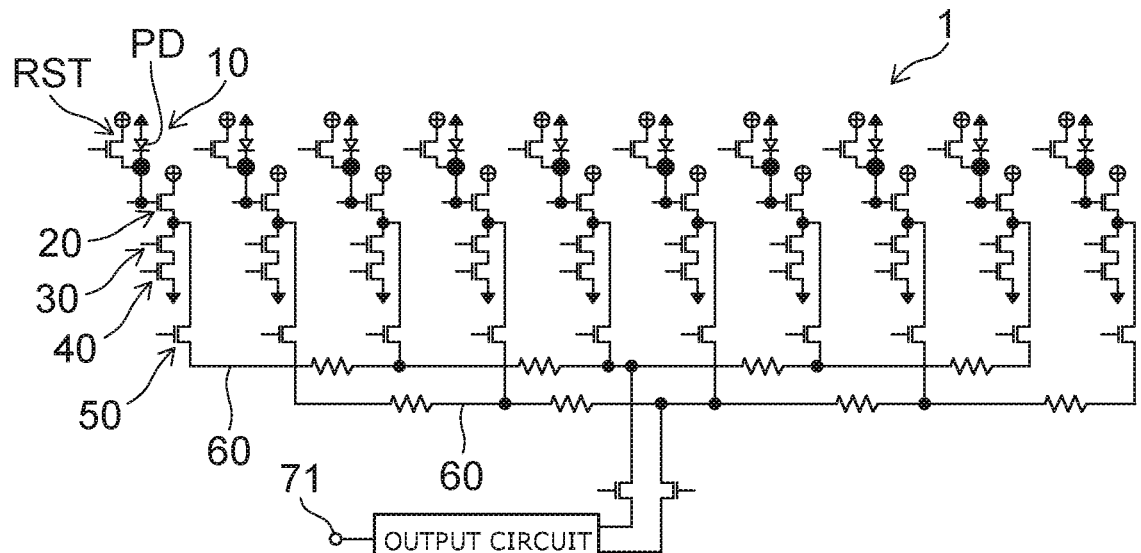
FIG. 1A is a circuit diagram showing a total configuration of a solid-state imaging device of a first embodiment.

According to one embodiment, a solid-state imaging device includes a plurality of pixels, a plurality of charge detection parts, a signal line, an output circuit, and a plurality of individual current sources. The pixels are arranged in a first direction. Each of the pixels includes a photoelectric conversion part. The charge detection parts convert signal charges of photoelectric conversion parts of the pixels to voltages. The signal line is commonly connected to the charge detection parts. The output circuit amplifies a signal output of the signal line. The individual current sources are provided for each of the pixels, and are connected to the signal line.

Various embodiments will be described hereinafter with reference to the accompanying drawings. In the drawings, similar components are marked with like reference numerals.

FIG. 1A is a circuit diagram showing the total configuration of a solid-state imaging device 1 of a first embodiment.

The solid-state imaging device 1 is, for example, a linear sensor including at least one row of pixel columns. The pixel columns have multiple pixels 10 arranged in a first direction. The respective pixels 10 include a photoelectric conversion part PD. A reset transistor RST which resets a potential of the photoelectric conversion part PD is connected to the photoelectric conversion part PD.

A charge detection part 20 is provided for each pixel 10. Multiple charge detection parts 20 are provided corresponding to the multiple pixels 10. The photoelectric conversion part PD is connected to a gate of the charge detection part 20.

A first stage signal line 60 is commonly connected to the multiple charge detection parts 20. FIG. 1A shows the example of, for example, two first stage signal lines 60 provided for one pixel column, however the number of the first stage signal line 60 is arbitrary.

In the example shown in FIG. 1A, the first stage signal line 60 commonly connected to the multiple odd-numbered pixels 10 in one pixel column and the first stage signal line 60 commonly connected to the multiple even-numbered pixels 10 in the one pixel column are provided. If the first stage signal line connected to one pixel column is divided into multiple, a load is reduced and a high speed operation is possible.

The first stage signal line 60 is connected to an output circuit 70.

Multiple shift registers 50 provided for each pixel 10 are connected to the first stage signal line 60.

Multiple individual current sources 30 provided for each pixel 10 are connected to the first stage signal line 60.

Figure 2:
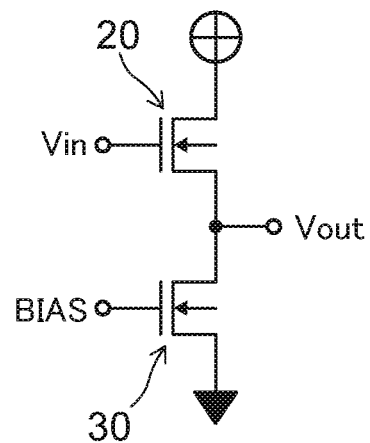
FIG. 2 is a circuit diagram of a charge detection part and an individual current source in the solid-state imaging device of the embodiment.

FIG. 2 is a circuit diagram of the charge detection part 20 and the individual current source 30.

The charge detection part 20 and the individual current source 30 configure, for example, a source follower circuit. A signal charge of the photoelectric conversion part PD is input to the gate of the charge detection part 20. A bias voltage is applied to a gate of the individual current source 30. The first stage signal line 60 is connected to a connection node of the charge detection part 20 and the individual current source 30.

A shift register 40 is connected between each of the individual current sources 30 and the ground. The shift register 40 operates in conjunction with the shift register 50, and the pixel 10 selected by the shift register 40 and the shift register 50 outputs sequentially the signal charge to the first stage signal line 60.

The signal charge photoelectric converted by the photoelectric conversion part PD is transferred to the charge detection part 20 to which each of the photoelectric conversion parts PD is connected. The signal charge is converted to a voltage by the charge detection part 20, and is sequentially output to the first stage signal line 60 by the shift register 50. The individual current source 30 operates when selected by the shift register 40.

The signal output to the first stage signal line 60 is input to the output circuit 70, converted serially, amplified, and output from an output terminal 71. In the configuration shown in FIG. 1A, an analogue signal is output from the output terminal 71 without A/D conversion.

Figure 1B:
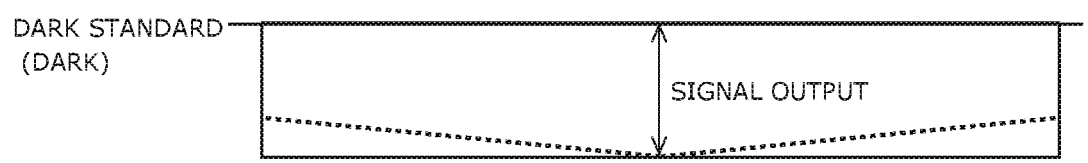
FIG. 1B is a signal output waveform diagram of the solid-state imaging device of the first embodiment.

FIG. 1B is a signal output waveform diagram from the output terminal 71.

The broken line shows the signal output waveform of the solid-state imaging device of comparative example, and the solid line shows the signal output waveform of the solid-state imaging device 1 of the first embodiment. Light amounts incident to all pixels 10 are assumed to be equal.

A solid-state imaging device of a comparative example does not include the individual current source 30 provided for each pixel 10, and has the configuration where one current source common to the multiple pixels 10 is provided in one first stage signal line 60.

In the comparative example, since interconnection lengths, namely, interconnection resistances from the individual shift register 50 provided for each pixel 10 to the output circuit 70 are different, the solid-state imaging device 1 is influenced by a voltage drop. Thus, the signal output waveform connecting the signal output of each pixel 10 is highest at the center of the pixel column having the shortest interconnection length to the output circuit 70, and the signal output gradually decreases from the center toward the end of the pixel column. This may cause signal non-uniformity.

According to the embodiment, the individual current source 30 is provided for each of the pixels 10. This reduces the influence from the voltage drop of the first stage signal line 60, and suppresses the non-uniformity of the signal output.

Figure 3:
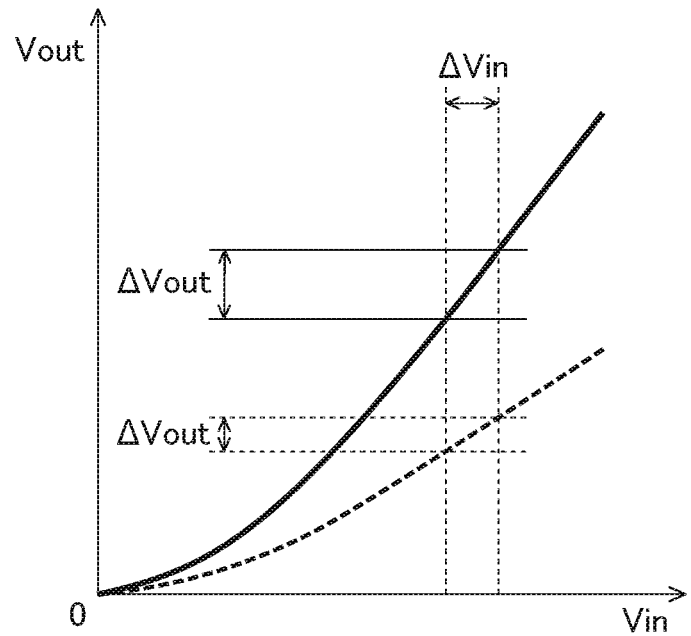
FIG. 3 is a Vin-Vout characteristics diagram of a first stage signal line in the solid-state imaging device.

FIG. 3 is a Vin-Vout characteristics diagram of the first stage signal line.

The solid line shows the Vin-Vout characteristics of the solid-state imaging device 1 of the first embodiment, and the broken line shows the Vin-Vout characteristics of the above comparative example.

The device of the embodiment can operate with a less current amount than the device of the comparative example. A gain of the source follower of the first stage signal line 60 of the embodiment can be more increased than that of the comparative example. This makes it possible to suppress amplification in the output circuit 70 which amplifies a noise as well and to improve an S/N ratio.

For example, bias voltages of the multiple individual current sources 30 are fixed to the same voltage among the multiple pixels 10 configuring one row of pixel columns. This makes it possible to more suppress the non-uniformity of the signal output without influence of fluctuation of the bias voltages.

Alternatively, the one row of pixel columns may be divided into multiple blocks each including multiple pixels 10. And the bias voltages of the multiple individual current sources 30 may be changed in block units. Adequate bias voltage control in block units makes it possible to reduce a signal delay time while suppressing the signal non-uniformity.

Figure 4A:
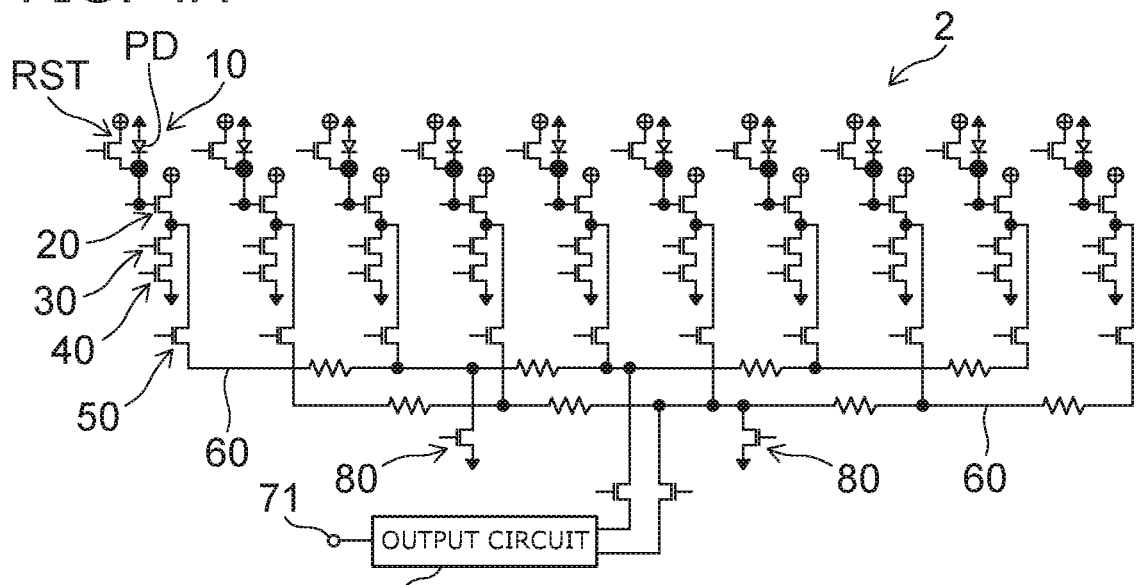
FIG. 4A is a circuit diagram showing a total configuration of a solid-state imaging device of a second embodiment.

FIG. 4A is a circuit diagram showing the total configuration of a solid-state imaging device 2 of a second embodiment.

The solid-state imaging device 2 is further provided with a common current source 80 in addition to the configuration of the solid-state imaging device 1 of the first embodiment. One common current source 80 is connected to one first stage signal line 60.

Figure 4B:
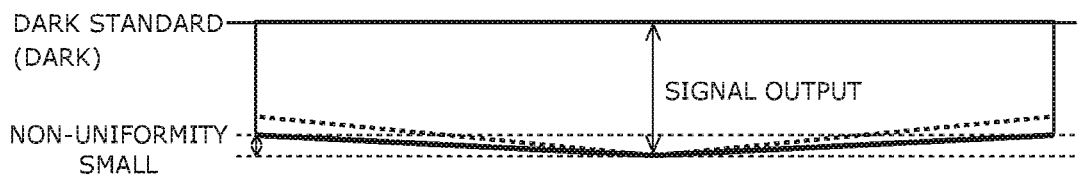
FIG. 4B is a signal output waveform diagram of the solid-state imaging device of the second embodiment.

FIG. 4B is a signal output waveform drawing similar to FIG. 1B.

The broken line shows the signal output waveform of the solid-state imaging device of the above comparative example, and the solid line shows the signal output waveform of the solid-state imaging device 2 of the second embodiment.

Also in the second embodiment, the capacity of the common current source 80 can be reduced by an amount corresponding to the provision of the individual current source 30. This reduces the influence from the voltage drop of the first stage signal line 60, and suppresses the non-uniformity of the signal output.

Furthermore, by using the individual current source 30 and the common current source 80 in common, it is possible to correspond to high speed operation when the readout time of one pixel is short.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A solid-state imaging device, comprising:
a plurality of pixels arranged in a first direction, each of the pixels including a photoelectric conversion part;
a plurality of charge detection parts converting signal charges of photoelectric conversion parts of the pixels to voltages;
a signal line commonly connected to the charge detection parts;
an output circuit amplifying a signal output of the signal line; and
a plurality of individual current sources provided for each of the pixels, and connected to the signal line.

2. The device according to claim 1, wherein bias voltages of the individual current sources are equal among the pixels.

3. The device according to claim 1, wherein
the pixels are divided into a plurality of blocks, and
the bias voltages of the individual current sources are changed in block units.

4. The device according to claim 1, further comprising a common current source commonly provided for the pixels in the signal line.

5. The device according to claim 1, wherein the output circuit outputs an analogue signal.

6. The device according to claim 5, wherein the output circuit converts serially a signal output to the signal line, and amplifies the signal output to the signal line.

7. The device according to claim 1, wherein
the charge detection parts and the individual current sources configure a source follower circuit, and
the photoelectric conversion parts are connected to gates of the charge detection parts.

8. The device according to claim 1, further comprising shift registers connected between the individual current sources and the ground, and selecting an operation of the individual current sources.

9. The device according to claim 1, wherein a plurality of signal lines are connected to one row of pixel columns including the pixels arranged in the first direction.

10. The device according to claim 1, wherein the signal line is connected to a connection node between the charge detection parts and the individual current sources.

* * * * *